(12) United States Patent
Basson et al.

(10) Patent No.: US 6,725,125 B2
(45) Date of Patent: Apr. 20, 2004

(54) SMART FILING SYSTEM

(75) Inventors: Sarah H. Basson, White Plains, NY (US); Dimitri Kanevski, Ossining, NY (US); Emmanuel Yashchin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 10/058,144

(22) Filed: Jan. 29, 2002

(65) Prior Publication Data

US 2003/0144761 A1 Jul. 31, 2003

(51) Int. Cl.$^7$ .............................................. G06F 19/00
(52) U.S. Cl. ........................ 700/159; 700/9; 700/179; 340/3.1
(58) Field of Search ................................ 700/9, 15, 29, 700/159, 160, 164, 169, 179; 340/3.1, 3.9

(56) References Cited

U.S. PATENT DOCUMENTS

| | | | | |
|---|---|---|---|---|
| 4,355,447 A | * | 10/1982 | DiMatteo et al. | 29/26 A |
| 5,067,085 A | * | 11/1991 | Wenzel et al. | 700/164 |
| 5,091,861 A | * | 2/1992 | Geller et al. | 700/192 |
| 5,298,006 A | * | 3/1994 | Miyajima | 483/1 |
| 5,508,077 A | * | 4/1996 | Chen et al. | 428/64.3 |
| 5,660,668 A | * | 8/1997 | Matheson et al. | 156/268 |
| 5,808,432 A | * | 9/1998 | Inoue et al. | 318/561 |

* cited by examiner

Primary Examiner—Jayprakash N. Gandhi
(74) Attorney, Agent, or Firm—McGuireWoods LLP; Stephen C. Kaufman

(57) ABSTRACT

A smart filing system and method of use. The filing system includes a sanding or filing surface and a sensor for sensing the filed or sanded surface. An analyzing module analyzing the information obtained from the sensor and is capable of directing the system to modify the sanding. This modification may include changing the size of grains used for sanding or using a different sanding pattern and the like. A method for using the system is also provided.

18 Claims, 7 Drawing Sheets

SMART FILING SYSTEM

BACKGROUND OF THE INVENTION

1. Field of the Invention

The present invention generally relates to a sanding or filing system and, more particularly, to a sanding or filing system which is capable of determining a smoothness/roughness of a surface and providing such information to a user for either automatic or manual adjustment of the sanding or filing.

2. Background Description

The sanding or filing of surfaces is typically accomplished by sanding the surface of the object with sandpaper, a file or other such apparatus which has a course surface. In use, an artisan or craftsman may sand the surface to a certain smoothness by either manually sanding the surface in a certain pattern or, alternatively, attaching the sandpaper to a belt sander or other similar mechanism.

In sanding the surface, the craftsman will periodically check the smoothness or roughness of the surface by sliding one's hand across the surface. Although this can provide a certain assurance of smoothness, there is no objective criteria to determine the exact smoothness of the surface. That is, there may be portions of the surface which are not the same smoothness as other portions and which cannot be ascertained simply by sliding one's hand across the sanded surface. Also, using these common systems cannot provide the same smoothness, to any accurate degree of certainty, as a similarly sanded surface. In addition, even if a rough spot was found by using the above method, there is no known mechanism to isolate only that region in order for only that region to then be sanded.

SUMMARY OF THE INVENTION

In one aspect of the present invention a smart filing system is provided. The smart filing system includes a sanding or filing surface adapted for working a surface and at least one sensor for sensing the level of roughness or smoothness of the surface. The system further includes a module for analyzing the level of roughness or smoothness of the surface. The analyzing module obtains the level of roughness or smoothness of the surface from the at least one sensor. A communication module is provided for communication between at least the analyzing module and the at least one sensor. In embodiments, a display and a database for storing information is provided. The filing system may also include a comparator module, a camera, a control planning module, a directing module and a graphical user interface.

In another aspect of the invention, a method for working (sanding or filing) a surface is also provided. The method includes the following steps:

(a) placing a sanding or filing surface on a surface to be worked;
(b) moving the sanding or filing surface along the surface in a predefined pattern;
(c) obtaining data about the surface via sensors;
(d) determining a roughness of the surface from the obtained data;
(e) determining whether the surface is at a predetermined smoothness based on the roughness of the surface obtained in step (d); and
(f) determining that the surface is at a predetermined smoothness and ending the working.

A third aspect of the present invention includes a computer programmable code for implementing the steps of the present invention.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is used for sanding or filing surfaces such as, for example, wood, metal and the like to a predetermined smoothness. The present invention is capable of determining the smoothness or roughness of a surface and adjusting the sanding surface in order to achieve a desired result. The smoothness of the sanded or filed surface, using the present invention, can be based on many parameters ranging from a smoothness of a previously sanded or filed surface (which is stored in a database) to a known smoothness of other objects (also stored in a database). The system of the present invention hence allows uniformity of smoothness over different surfaces, as well as allows a user to have an objective measurement of the smoothness of the surface.

Figure 1A:
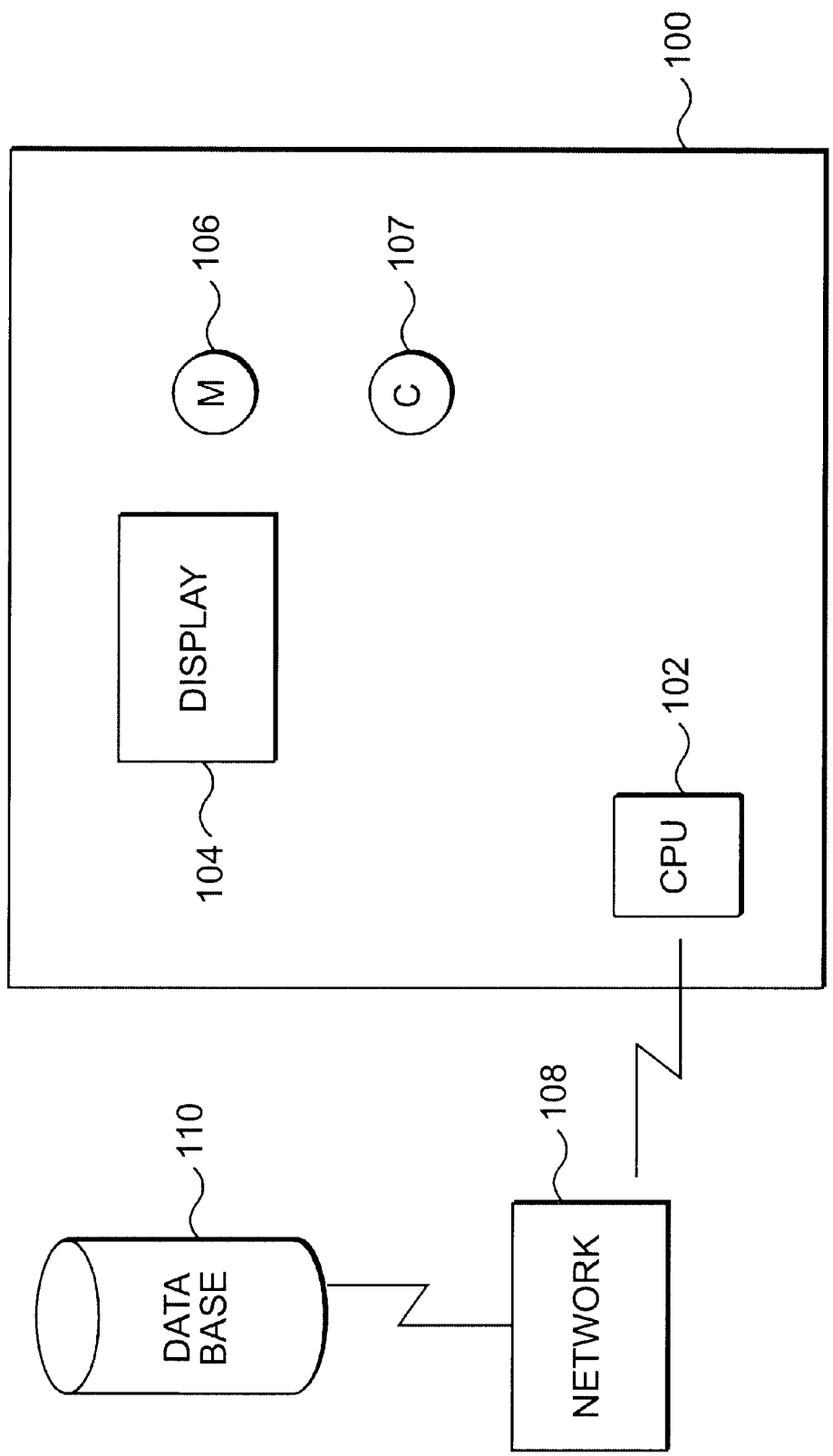
FIG. 1a shows a diagram of the sanding system of the present invention.
Figure 1B:
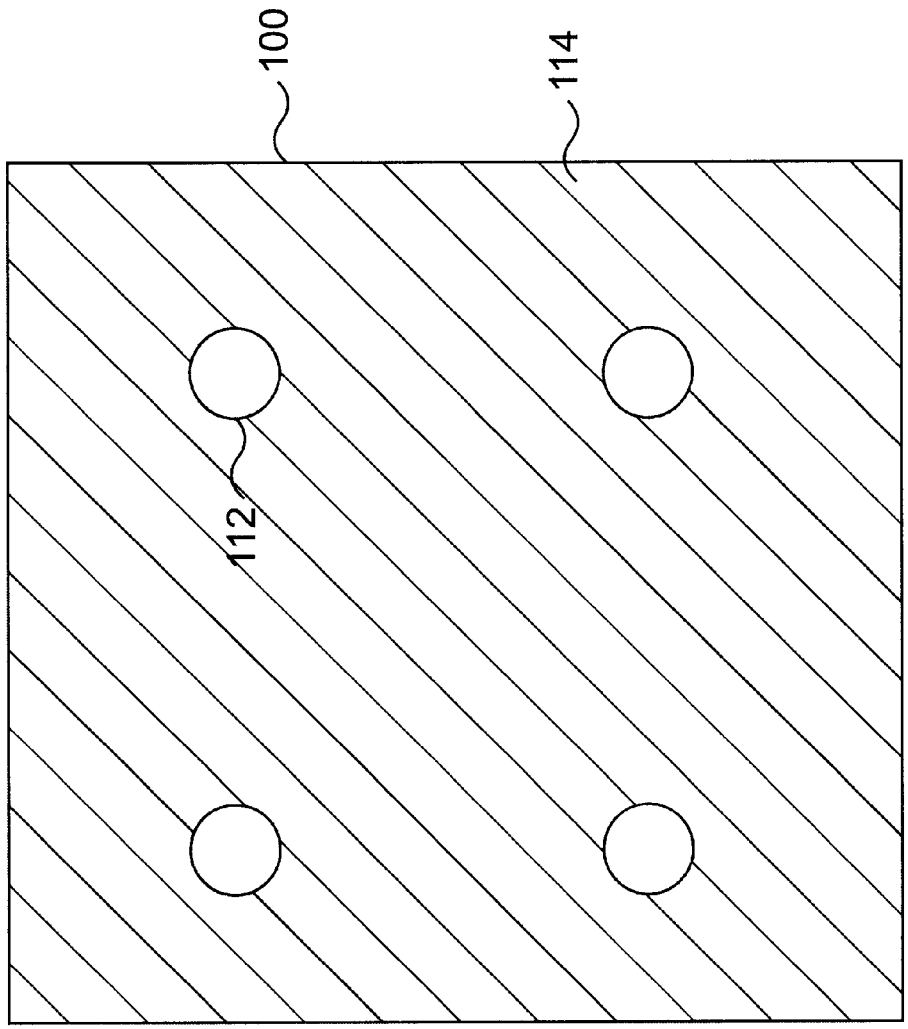
FIG. 1b is a bottom partial view of the sanding system of the present invention.

Referring now to the drawings, and more particularly to FIGS. 1a and 1b, there is shown the mechanism of the present invention. Specifically, the present invention is generally depicted as reference number 100 and may either be generally a sanding or filing mechanism (referred hereinafter as a sanding system). The sanding system 100 of the present invention includes a central processing unit (CPU) 102 which is capable of running different applications, as discussed below. A display 104 as well as a microphone 106 is also provided with the sanding mechanism 100. The display 104 provides the user with pertinent information about the surface being sanded or filed (i.e., the smoothness or roughness of the surface), and may also show pertinent information about smoothness profiles of other surfaces. The smoothness features of the other surfaces may be preprogrammed or stored into a memory or database 110 of the system of the present invention. The display 104 may show the smoothness level of a surface in a variety of identifiable colors or sounds or other indicia such as a number or the like. In embodiments, a camera 107 may be used to send detailed, possibly microscopic, images of the surface being sanded to the display 104 for viewing by the user. The microphone 106 allows the user to interface with the system of the present invention.

Still referring to FIGS. 1a and 1b, the system of the present invention may be connected to a wireless network 108 which is capable of sending and receiving data to and from the database 110. As previously discussed, the database 110 may contain information such as, for example, (i) particular materials previously used by a particular user and the smoothness of those materials or (ii) information from other sources or (iii) identity of the size/type of granules used to perform the sanding or filing of a particular material in order to achieve a particular finish. In embodiments, the system of the present invention may be connected to the Internet to allow for references to the smoothness of materials unavailable locally or surfaces that the user has worked on in the past.

The system of the present invention also includes at least one sensor 112 and a sanding or filing surface 114. The sensor 112 is used to sense or analyze the level of roughness or smoothness of a given surface. This information is fed into the CPU 102 for analysis which, in turn, may be utilized by the user to determine, for example, the required sanding surface (size of the sanding grains or granules) needed to achieve a certain surface smoothness. The sanding or filing surface 114 may vibrate, rotate or spin to achieve the desired types of smoothness or finishes on the surface of a given material.

The different levels of smoothness of the sanding or filing surface 114 may be changed automatically by the system of the present invention or manually by the user. In one embodiment, the sanding or filing surface is capable of rotating between different levels of smoothness or roughness for achieving different levels of smoothness. The system of the present invention may recommend a program for the filing/sanding by starting with large grains and then switching or rotating to a smaller grain to easily facilitate the smoothness of the surface.

In use, the user may designate the level of smoothness with numbers or even by comparing the desired level to a particular material. For example, the user may designate the desired smoothness of surface "B" to be similar to that of surface "A". The smoothness of surface "B" would be stored in the database or accessible over the Internet. The user would then maneuver the sensor 112 and sanding or filing surface 114 over surface "A" in order to analyze the surface "A" and, in turn, sand or file the surface to be substantially identical to that of surface "B". The present invention, using the data obtained from surface "A", may recommend a program for the filing/sanding and, in cases, may adjust the sanding or filing surface 114 to the appropriate grain size.

Figure 2:
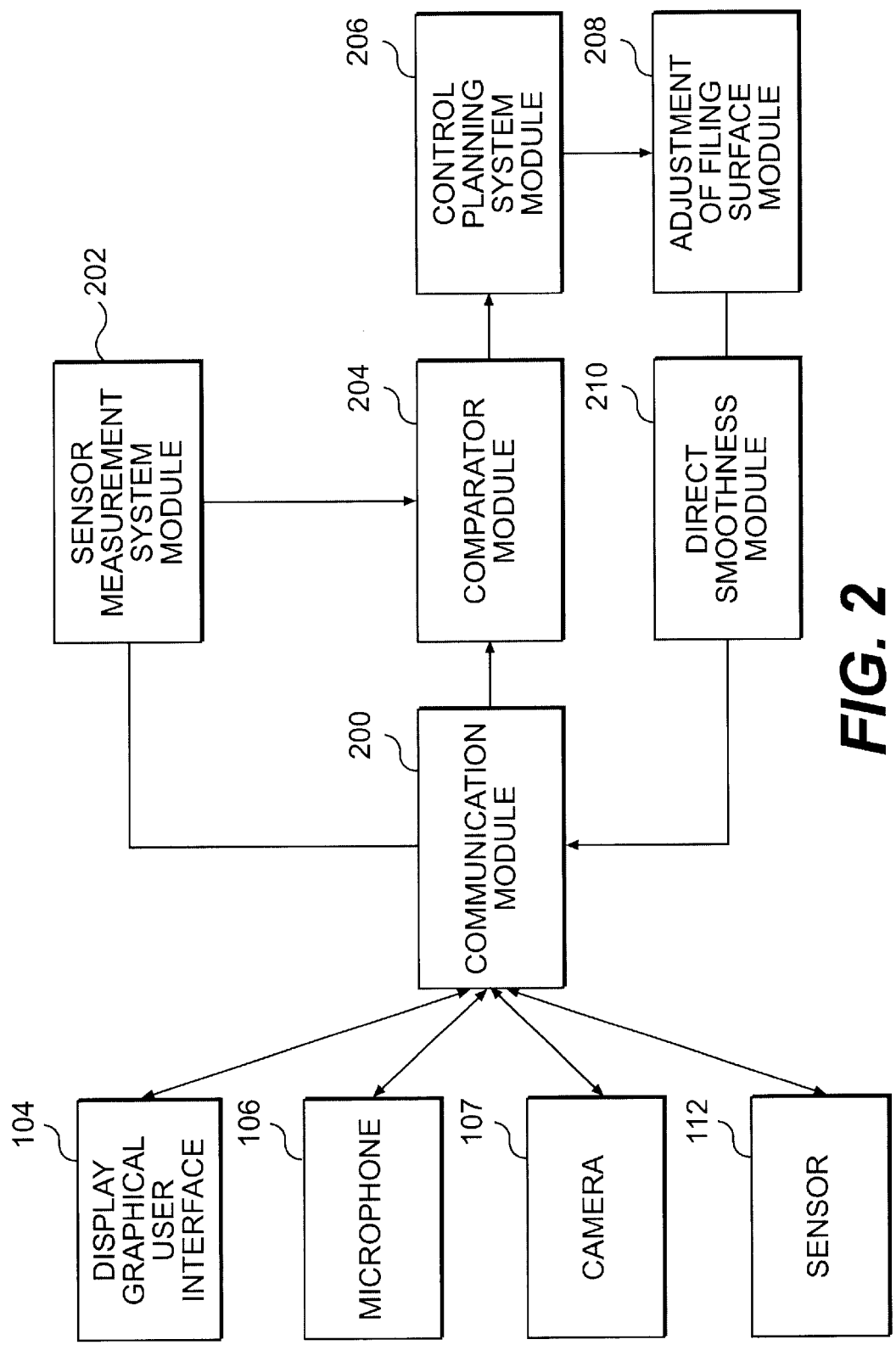
FIG. 2 shows a block diagram of the system of the present invention.

FIG. 2 shows a block diagram implementing the system of the present invention. The block diagram of FIG. 2 may equally represent a high level flow diagram implementing the steps of the present invention. In particular, a communication module 200 allows the system to receive a variety of information, via the wireless network, from the sensors 112, the display 104 (via a graphical user interface), the microphone 106 or the camera 107. The communication module 200 communicates with the sensor measurement module 202 which receives information directly from the sensors 102 or from the Internet or other source. A comparator module 204 receives the information from the sensor measurement module 202 and the communication module 200. In embodiments, the comparator module 204 may also receive information from the camera 107. The comparator module 204 is designed to compare the results of analysis by the sensory system of the smoothness of the different surfaces as designated by the user.

Depending on how similar the smoothness of the surface is to the user's request, a control planning module 206 will control the functions of the file system. This may include, for example, (i) whether the user should continue to sand or file the surface, (ii) whether the user should use a different size grain or (iii) whether a speed, width or depth of the sanding or filing should be changed by the user. It is noted that the system of the present invention may also automate these functions so as to make the adjustments on the "fly" or during the actual sanding or filing, via adjusting module 208. The sanding or filing surface can be adjusted at this point to expose a rougher/heavier or smoother/finer grained sanding surface.

A directing module 210 directs the path of smoothness required by the file system. That is, the directing module 208 is responsible for informing the user which direction/parts of the surface require additional filing or sanding. If, for instance, a surface is smooth, the system will inform the user to circumvent that region to avoid making the surface uneven with the remaining portions of the surface. This information may then be provided on the display 104, via the communication module 200. To show this information, for example, the display 104 may use darker and lighter colors to indicate the smoother or rougher regions.

Figure 3:
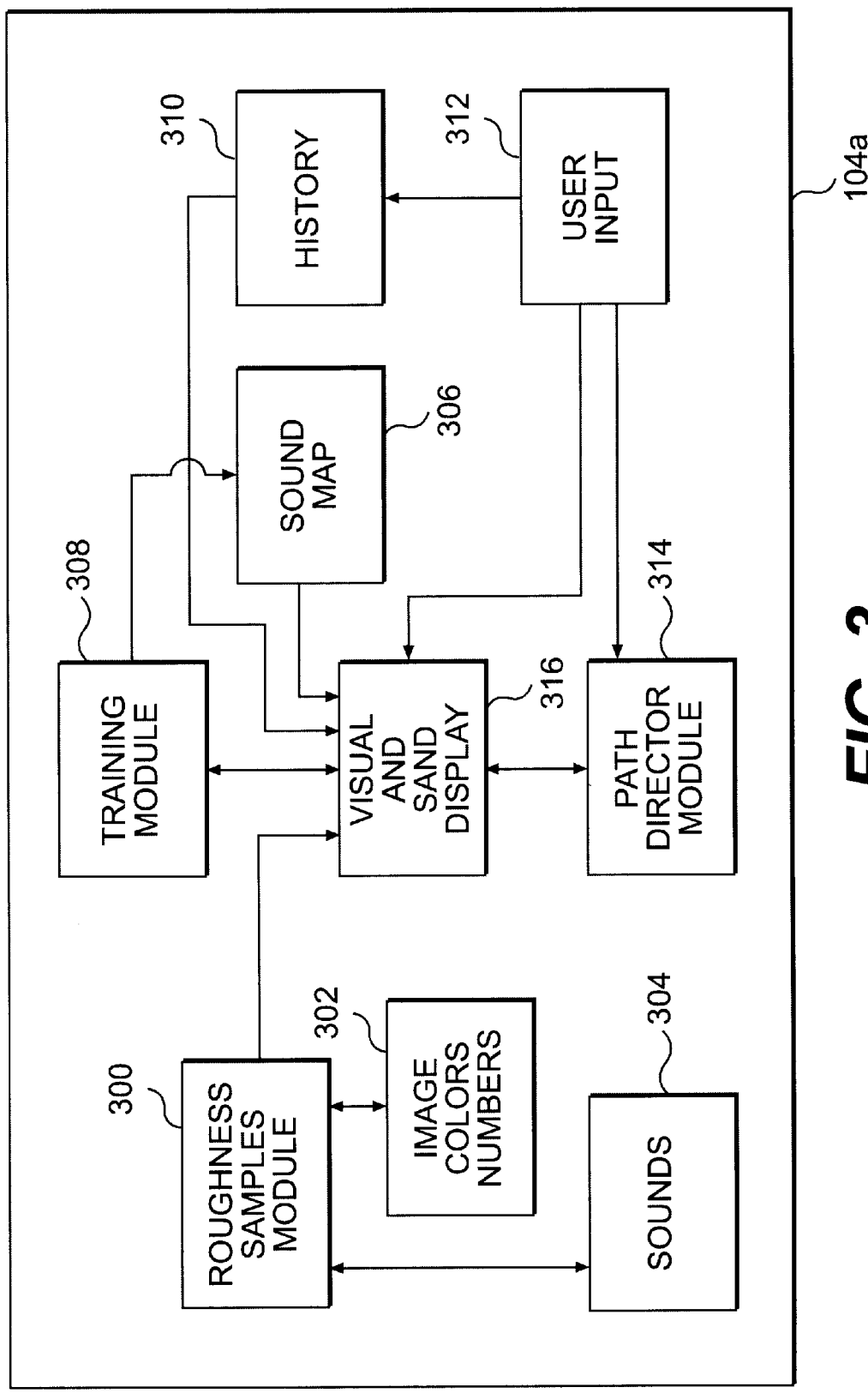
FIG. 3 shows an example of a graphical user interface.

FIG. 3 shows an example of a graphical user interface. The graphical user interface is generally depicted as reference numeral 104a and includes several modules which may provide information to be displayed on display 104. For example, a material roughness sample module 300 may include examples of different materials with different surfaces that can be displayed on display 104 after having been previous scanned or downloaded from the network or the Internet. The level of roughness may be displayed through an image, colors, numbers module 302 or through sound via a sound module 304. The sound module 304 will provide sound for transmitting through a speaker which is preset to signify the level of smoothness through intensity and type of sounds. A sound map module 306 represents a sound map utilized to identify the material roughness samples. The user may designate the sounds that represent a type of surface prior to any sanding/filing.

FIG. 3 further shows a training module 308 which allows the user to designate which sounds and/or colors represent what level of roughness/smoothness of a given surface using, for example, examples of existing materials. A history module 310 contains data on user history for the purpose of allowing the user to utilize past sanding/filing programs, methods, and grains types/sizes with the present surface. A user input 312 provides a mechanism for the user to input information into the system of the present invention such as the user history, whether the information be provided through automatic speech recognition, automatic handwriting recognition, gesture recognition, or through mouse or pen control. The training module 305 may be utilized to train at least the sound map module 306. A path module 314 indicates the correct path for the user to move the sander, and such information may be provided by the user input module 314, or may be automatically generated by the system of the present invention. A display module 316 may be used to display the colors, the history and the user input information (provided by the user input module 312), as well as other information such as the smoothness of the surface and other pertinent information.

Figure 4:
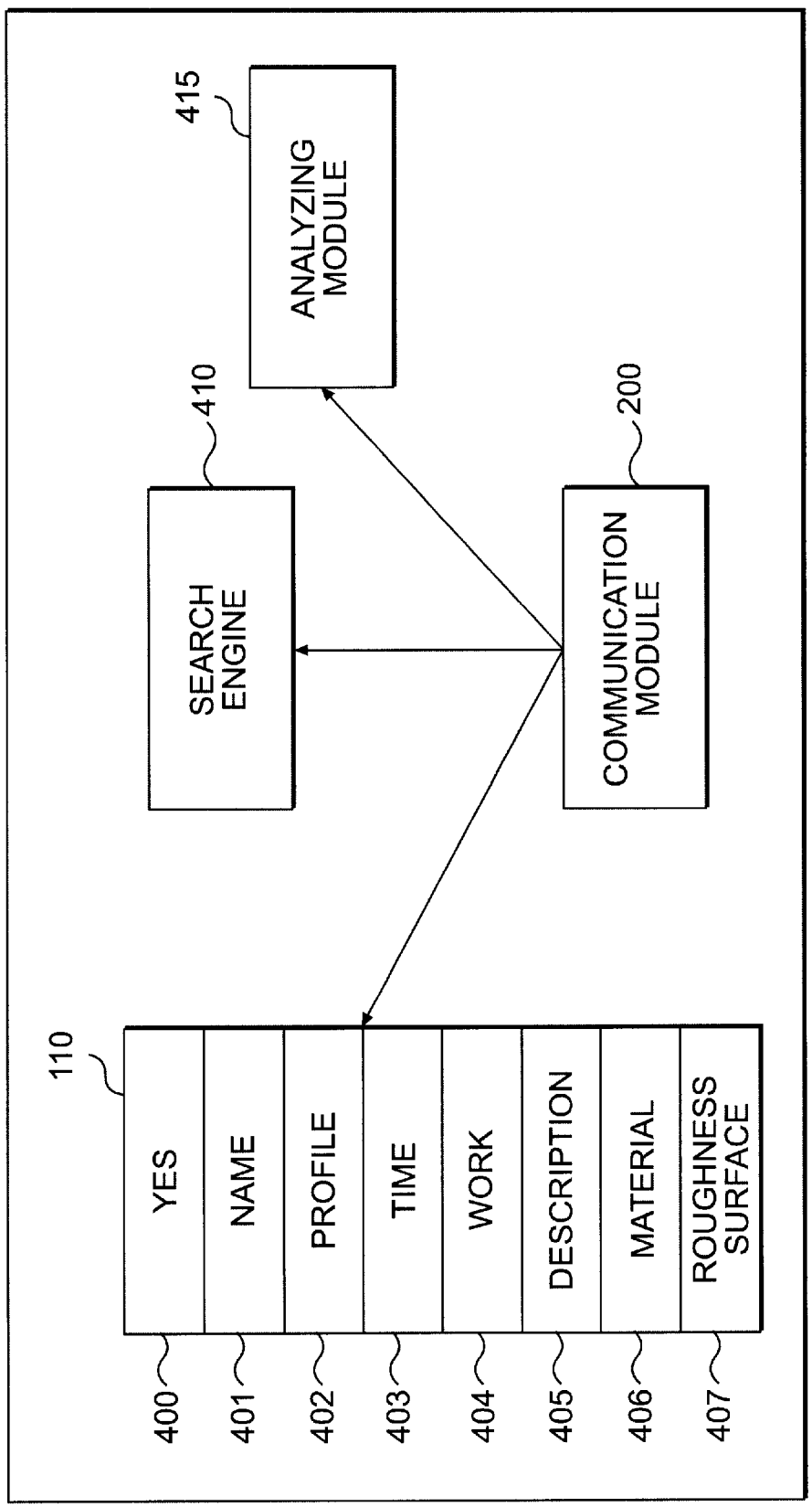
FIG. 4 shows the contents of the database 110 and the communications with the network.

FIG. 4 shows the contents of the database 110 and communications with the network. In the embodiment of FIG. 4, the communication module 200 communicates with the database 110, as well as a search engine 410 and an analyzing module 415. As previously discussed, the communication module 200 is responsible for coordinating the transportation of data throughout the network. The search engine 410 is capable of searching the database contents for specific information; that is, the search engine 410 will assist the user in finding information about the last time the user or another party worked on this material/surface and other pertinent information. The analyzing module 415 is capable of analyzing images obtained from the camera and, in embodiments, may send such data to the CPU. In the database, information includes, for example, user ID 400, user name 401, user profile 402, an amount of time worked 403, the type of work 404 and a description of the work 405 as well as the materials 406 and roughness of specific surfaces 407 (before and after the work). It should be recognized by those of ordinary skill in the art that other information may also reside in the database.

Figure 5B:
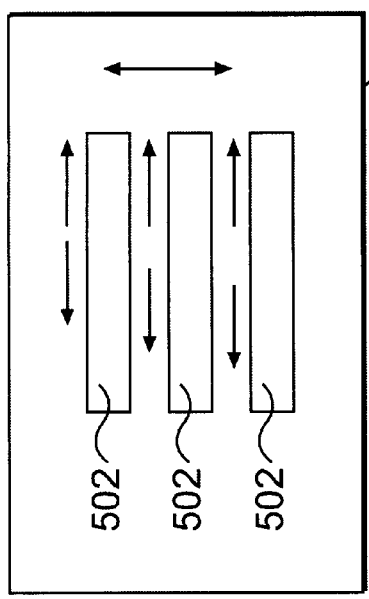
FIGS. 5a–5c show several examples of the sanding or filing surface.
Figure 5C:
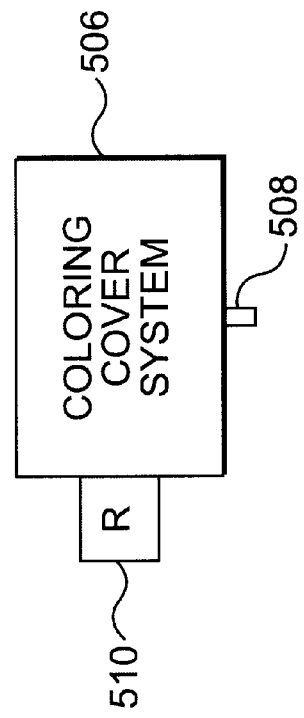
Figure 5A:
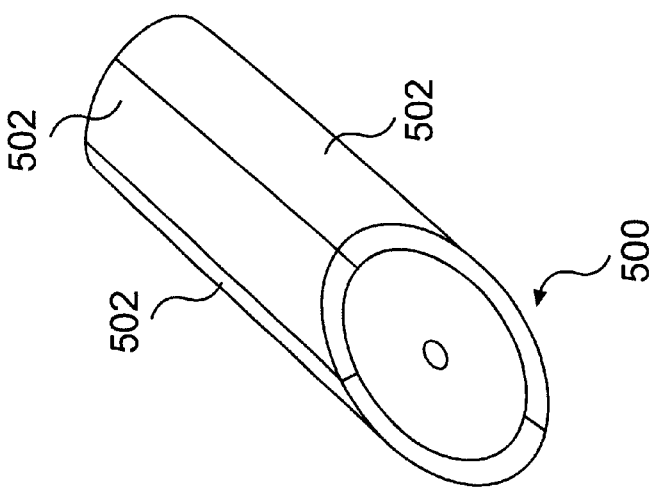

FIGS. 5a–5c show several examples of the sanding or filing surface. In FIG. 5a, a rotating drum 500 is provided with different roughness surfaces 502 (types of grains). In this embodiment, the system of the present invention is capable of rotating between the different level of grains depending on the desired smoothness of the object surface. The rotation of the rotating drum 500 may be in response to the analysis of the surface being sanded or filed by the system of the present invention, or in response to a user's request based on the information located within the database.

FIG. 5b shows a block sander 504 with different levels of grain 502 for smoother/rougher sanding. The different level of grains 502 may be moved left, right, up and down to thereby enable the desired roughness to be in contact with the object surface. Again, the different level of grains 502 may be changed automatically by the system of the present invention based on the above disclosed factors.

FIG. 5c shows a color system 506 used by the present invention. In this system, different colors may be ejected from ejection nozzle 508 based on a smoothness of the object surface. Each separate color or a combination of colors may be ejected directly onto the object surface to indicate a desired smoothness, where such color pattern would be shown on the display with a chart or other indicia comparing the colors to a smoothness parameter. The colors may be stored in a reservoir 510.

Figure 6:
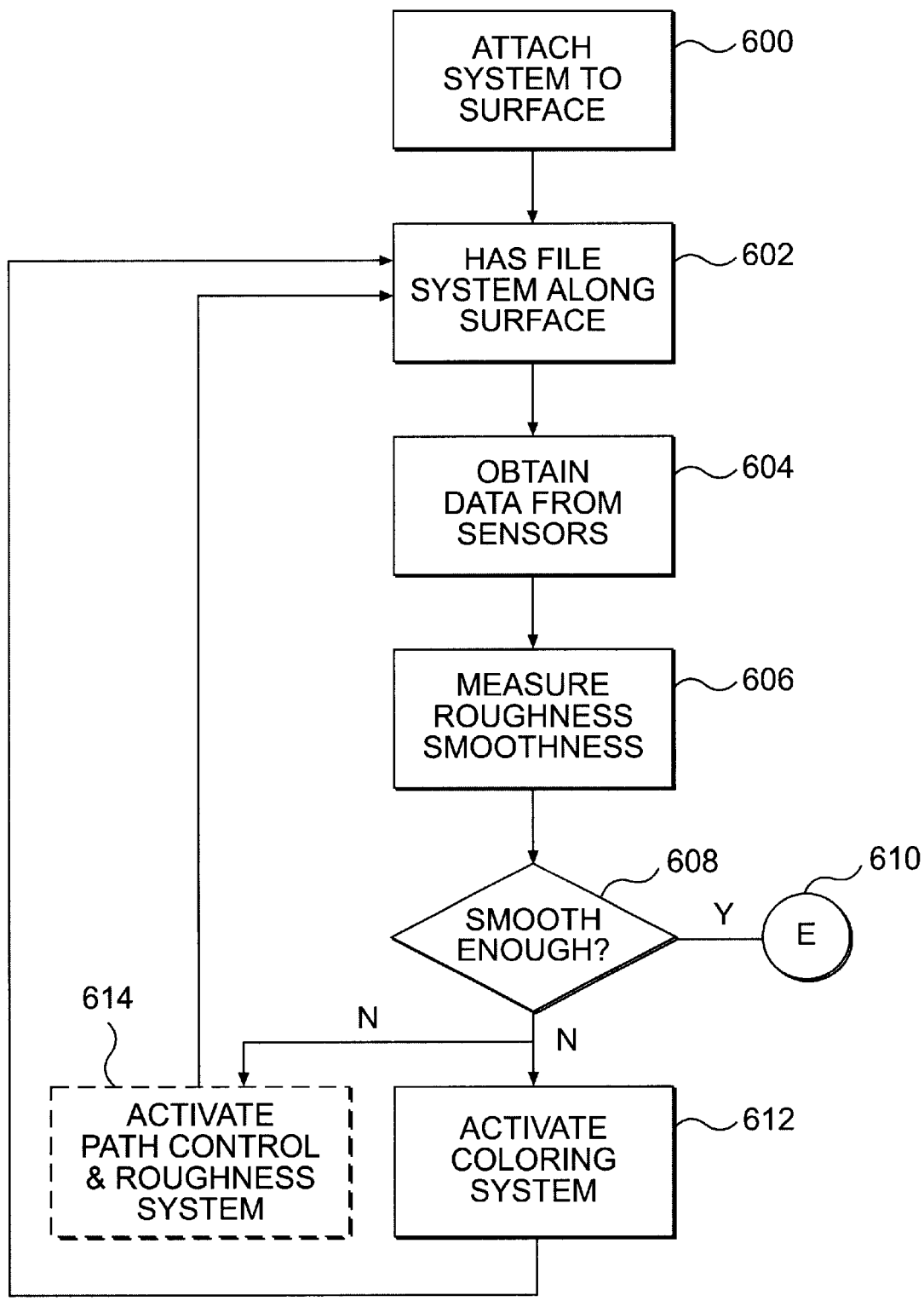
FIG. 6 is a flow diagram showing the steps implementing the method of the present invention.

FIG. 6 is a flow diagram of the steps implementing the method of the present invention. The steps of the present invention may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. FIG. 6 may equally represent a high level block diagram of the system of the present invention, implementing the steps thereof.

In FIG. 6, the file system is attached to the surface to be sanded or filed, at step 600. At step 602, the sanding system of the present invention is moved along the surface to be sanded. This movement may be based on the information obtained from the directing module 210 which directs the path of smoothness required by the file system. At step 604, data is obtained from the sensors. At step 606, the system of the present invention uses the data obtained from the sensors to determine a roughness/smoothness of the surface. At step 608, a determination is made as to whether the surface is sanded to the desired smoothness. If yes, the system ends at step 610.

If the surface is not sanded to the desired smoothness then, at step 612, the coloring system is activated in order to determine and color the areas of smoothness or roughness based on predetermined coloring schemes. The colors may, in embodiments, be provided on the display. Alternatively, at step 612, the path control and roughness system are activated. In this latter scenario, the control planning module 206 may, for example, decide (i) whether the user should use a different size grain or (ii) whether a speed, width or depth of the sanding or filing should be changed by the user or system of the present invention. The changing of the system parameters may be provided by the adjusting module 208 to expose, for example, a rougher/heavier or smoother/finer grained sanding surface. In either alternative scenario, the method of the present invention reverts back to steps 602 through 608 until the surface is sanded to the desired smoothness.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A smart filing system having a sanding or filing surface, comprising:

a sanding or filing surface adapted for working a surface;

at least one sensor for sensing the level of roughness or smoothness of the surface;

means for analyzing the level of roughness or smoothness of the surface, the analyzing means obtaining the level of roughness or smoothness of the surface from the at least one sensor;

communication means for providing communication between at least the analyzing means and the at least one sensor; and a graphical user interface providing indicia representative of the roughness or smoothness of the surface.

2. The system of claim 1, wherein the analyzing means is a central processing unit (CPU).

3. The system of claim 1, further comprising a display for displaying information relating to the surface, wherein the information relating to the surface includes one of (i) smoothness level of the surface in a variety of identifiable colors and (ii) smoothness profiles of other surfaces.

4. The system of claim 1, further comprising a database for storing information including at least one of (i) user ID, (ii) user name, (iii) user profile, (iv) an amount of time worked, (v) a type of work, (vi) a description of the work, (vii) types of materials, (viii) roughness of specific surfaces before and after the work and (ix) identification of a size/type of granules for working on a predetermined surface to achieve a predetermined finish.

5. The system of claim 4, further comprising a search engine for searching the information residing on the database.

6. The system of claim 1, comprising a wireless network which allows the communication means to communicate between the at least the analyzing means and at least one sensor.

7. The system of claim 1, further comprising a comparator module which receives information from the at least one sensor in order to compare results of analysis of the analyzing means with different surfaces designated by a user.

8. The system of claim 1, further comprising a camera for providing images of the surface, wherein the comparator module receives the images from the camera and compares the images with other predetermined information.

9. The system of claim 1, further comprising a control planning module for determining at least one of (i) whether a user should continue to work the surface, (ii) whether the user should use a different size grain associated with the sanding or filing surface and (iii) whether a speed, width or depth of the working should be changed by the user.

10. The system of claim 1, further comprising a directing module for directing a path of the sanding or filing surface such that a user will be notified to circumvent a predetermined surface region to avoid making the surface uneven with remaining portions of the surface.

11. The system of claim 1, wherein the graphical user interface comprises at least one of:
  a material roughness sample module having examples of different materials with different surfaces residing therein;
  an image, colors, numbers module for displaying roughness properties of predetermined surfaces;
  a sound module providing sound for transmitting through a speaker which is preset to signify a level of smoothness through intensity and type of sounds;
  a sound map module utilized to identify material roughness of samples;
  a history module which contains data on user history;
  a training module for training at least the sound module;
  a display module for displaying at least the colors, the history and the examples of different materials;
  a user input for allowing the user to input information through automatic speech recognition, automatic handwriting recognition, gesture recognition, or mouse or pen control to the history module and the display; and
  a path module for correcting a path for the user to move the sanding or filing surface.

12. A smart filing system having a sanding or filing surface, comprising:
  a sanding or filing surface adapted for working a surface;
  at least one sensor for sensing the level of roughness or smoothness of the surface;
  means for analyzing the level of roughness or smoothness of the surface, the analyzing means obtaining the level of roughness or smoothness of the surface from the at least one sensor;
  communication means for providing communication between at least the analyzing means and the at least one sensor; and
  a changing means for automatically changing a level or grain size of the sanding or filing surface.

13. A method of working a surface, comprising the steps of:
  (a) placing a sanding or filing surface on a surface to be worked;
  (b) moving the sanding or filing surface along the surface in a predefined pattern;
  (c) obtaining data about the surface via sensors;
  (d) determining a roughness of the surface from the obtained data;
  (e) determining whether the surface is at a predetermined smoothness based on the roughness of the surface obtained in step (d);
  (f) determining that the surface is at a predetermined smoothness and ending the working;
  (g) when step (f) is not determined to be at the predetermined smoothness, then activating a graphical system to provide predetermined indicia representative on the roughness of the surface.

14. The method of claim 13,
  wherein the graphical system is a coloring system to color the surface in predetermined colors based on the roughness of the surface; and
  (h) repeating steps (a) through (f) until the surface is at the predetermined smoothness.

15. The method of claim 14 wherein the step of (g) colors the surface at different predetermined colors for each roughness profile determined at step (d).

16. The method of claim 14, wherein the step of (g) provides colors on a display at different predetermined colors for each roughness profile determined at step (d).

17. A method of working a surface, comprising the steps of:
  (a) placing a sanding or filing surface on a surface to be worked;
  (b) moving the sanding or filing surface along the surface in a predefined pattern;
  (c) obtaining data about the surface via sensors;
  (d) determining a roughness of the surface from the obtained data;
  (e) determining whether the surface is at a predetermined smoothness based on the roughness of the surface obtained in step (d);
  (f) determining that the surface is at a predetermined smoothness and ending the working; and
  (g) when step (f) is not determined to be at the predetermined smoothness, then deciding (i) whether a different size grain should be used or (ii) whether a speed, width or depth of the working should be changed;
  (h) changing at least one of the parameters of step (g) and repeating steps (a) through (g) until the surface is at the predetermined smoothness.

18. A machine readable medium containing code for working a surface, the code implementing the steps of:
  (a) placing a sanding or filing surface on a surface to be worked;
  (b) moving the sanding or filing surface along the surface in a predefined pattern;
  (c) obtaining data about the surface via sensors;
  (d) determining a roughness of the surface from the obtained data;
  (e) determining whether the surface is at a predetermined smoothness based on the roughness of the surface obtained in step (d);
  (f) determining that the surface is at a predetermined smoothness and ending the working;
  (g) when step (f) is not determined to be at the predetermined smoothness, then activating a coloring system to color the surface in predetermined colors based on the roughness of the surface; and
  (h) repeating steps (a) through (g) until the surface is at the predetermined smoothness.

* * * * *